US012810401B2

(12) United States Patent
Touze et al.

(10) Patent No.: US 12,810,401 B2
(45) Date of Patent: Nov. 24, 2026

(54) TONE MAPPING WITH CONFIGURABLE HDR AND SDR DIFFUSE WHITE LEVELS

(71) Applicant: INTERDIGITAL MADISON PATENT HOLDINGS, SAS, Paris (FR)

(72) Inventors: David Touze, Rennes (FR); Patrick Lopez, Livre sur Changeon (FR); Robin Le Naour, Cesson-Sevigne (FR); Frederic Plissonneau, Thorigne-Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 260 days.

(21) Appl. No.: 18/707,529

(22) PCT Filed: Oct. 24, 2022

(86) PCT No.: PCT/EP2022/079534
§ 371 (c)(1),
(2) Date: May 3, 2024

(87) PCT Pub. No.: WO2023/078707
PCT Pub. Date: May 11, 2023

(65) Prior Publication Data

US 2025/0005725 A1 Jan. 2, 2025

(30) Foreign Application Priority Data

Nov. 8, 2021 (EP) .................................... 21306562

(51) Int. Cl.
*G06T 5/00* (2024.01)
*G06T 5/92* (2024.01)

(52) U.S. Cl.
CPC ...... *G06T 5/92* (2024.01); *G06T 2207/20208* (2013.01)

(58) Field of Classification Search
CPC ........................ G06T 5/92; G06T 2207/20208
See application file for complete search history.

(56) References Cited

U.S. PATENT DOCUMENTS

| | | | |
|---|---|---|---|
| 8,050,512 | B2 | 11/2011 | Daly et al. |
| 2006/0104533 | A1 | 5/2006 | Daly et al. |
| 2018/0352257 | A1 | 12/2018 | Leleannec et al. |

FOREIGN PATENT DOCUMENTS

| | | | |
|---|---|---|---|
| CN | 109219961 A | 1/2019 | |
| EP | 3621307 A1 * | 3/2020 | ........... H04N 19/162 |

(Continued)

OTHER PUBLICATIONS

Report ITU-R BT.2446-1 Methods for Conversion of High Dynamic Range Content to Standard Dynamic Range Content and Vice-Versa. International Telecommunication Union, Mar. 2021. (pp. 14-24) (Year: 2021).*

(Continued)

*Primary Examiner* — Oneal R Mistry
*Assistant Examiner* — Sydney L Blacksten
(74) *Attorney, Agent, or Firm* — Condo Roccia Koptiw LLP

(57) ABSTRACT

A method comprising: obtaining (401) high dynamic range data; computing (402, 403) a first tone mapping curve from the high dynamic range data corresponding to low high dynamic range values of a combined tone mapping curve, the first tone mapping curve ending by a point, called first point, with an abscissa representative of a high dynamic range diffuse white and an ordinate representative of a standard dynamic range diffuse white, the combined tone mapping curve allowing obtaining standard dynamic range data from the high dynamic range data; and completing (404) the combined tone mapping curve with a second tone mapping curve for high standard dynamic range starting from the first point.

18 Claims, 11 Drawing Sheets

(56) References Cited

FOREIGN PATENT DOCUMENTS

| | | | |
|---|---|---|---|
| JP | 2021-064917 | A | 4/2021 |
| WO | 2017157977 | A1 | 9/2017 |
| WO | WO 2021175633 | A1 | 9/2021 |

OTHER PUBLICATIONS

"Infrastructure of audiovisual services—Coding of moving video—Advanced video coding for generic audiovisual services", International Telecommunication Union (ITU-T), Telecommunication Standardization Sector of ITU, Series H: Audiovisual and Multimedia Systems, Recommendation ITU-T H.264, Aug. 2021, 844 pages.

"HDR/WCG Metadata Packing and Signaling in the Vertical Ancillary Data Space", The Society of Motion Picture and Television Engineers (SMPTE), SMPTE Standard, SMPTE ST 2108-1:2018, Sep. 12, 2018, 9 pages.

"Infrastructure of audiovisual services—Coding of moving video—High Efficiency Video Coding", International Telecommunication Union, Telecommunication Standardization Sector of ITU, Series H: Audiovisual and Multimedia Systems, Recommendation ITU-T H.265, Aug. 2021, 716 pages.

"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

"High-Performance Single Layer High Dynamic Range (HDR) System for use in Consumer Electronics devices; Part 1: Directly Standard Dynamic Range (SDR) Compatible HDR System (SL-HDR1)", European Broadcasting Union (EBU), European Telecommunication Standards Institute (ETSI), Technical Specification ETSI TS 103 433-1 v1.4.1, Aug. 2021, 136 pages.

"Guidance for operational practices in HDR television production", International Telecommunication Union, Radiocommunication Sector of ITU, BT Series, Broadcasting Service, Report ITU-R BT.2408-3, Jul. 2019, 44 pages.

Meylan et al., "Tone mapping for high dynamic range displays", International Society for Optics and Photonics (SPIE), Proceedings vol. 6492, Electronic Imaging 2007, Jan. 28, 2007, 12 pages.

* cited by examiner

TONE MAPPING WITH CONFIGURABLE HDR AND SDR DIFFUSE WHITE LEVELS

CROSS REFERENCE TO RELATED APPLICATIONS

This application is a U.S. National Stage Application under 35 U.S.C. § 371 of International Patent Application No. PCT/EP2022/079534, filed Oct. 24, 2022, which is incorporated herein by reference in its entirety.

This application claims priority to European Application No. 21306562.6, filed Nov. 8, 2021, which is incorporated herein by reference in its entirety.

1. TECHNICAL FIELD

At least one of the present embodiments generally relates to a method and a device for producing of Standard Dynamic Range (SDR) video from High Dynamic Range (HDR) video and in particular, relates to a method and a device for defining a tone mapping curve.

2. BACKGROUND

Recent advancements in display technologies allow for an extended dynamic range of color, luminance and contrast in images to be displayed. The term image refers here to an image content that can be for example a video or a still picture or image.

High-dynamic-range (HDR) video consist in video having a dynamic range extended comparing to the dynamic range of standard-dynamic-range (SDR) video. HDR video are captured by HDR capture devices and displayed by display devices capable of brighter whites and deeper blacks. To accommodate this, HDR capable encoding standards allow for a higher maximum luminance and use at least a 10-bit dynamic range (compared to a maximum of 8-bit (respectively 10-bit) for non-professional (respectively for professional) SDR video) in order to maintain an adapted precision across this extended range.

HDR production is a new domain and there will be a transition phase during which both HDR contents and SDR contents will coexist. During this coexistence phase, a same live content will be produced simultaneously in a HDR and a SDR version. A user can then display the HDR or the SDR version of the content depending on his preferences or capabilities.

The current trend of the content production industry is:

first, to produce HDR contents and then to derive automatically SDR contents from the HDR contents using automatic tools; and, second, to apply a controlled and safe approach for the HDR production to avoid delivering bad HDR contents to users, that could be counterproductive for the HDR technology.

In that respect, some recommendations were introduced by the ITU-R document "Report ITU-R BT.2408-3, Guidance for operational practices in HDR television production, July 2019", just called BT.2408-3 report in the following. One important recommendation introduced in the BT.2408-3 report is a constraint of HDR Diffuse White set to a fixed value equal to "203" nits. This constraint allows using fixed 3D-LUTs (Look-Up Tables) to implement SDR to HDR conversions (i.e. Inverse Tone Mapping (ITM)) and HDR to SDR conversions (Tone Mapping (TM)).

Having a HDR Diffuse White set to a fixed value equal to "203" nits is a strong constraint for contents producers. Indeed, with these constraints, HDR cameras are not exploited to their maximum capabilities and cameramen/director of photography are very restricted in their choices/artistic intent.

It is desirable to overcome the above drawbacks.

It is particularly desirable to propose a system allowing more flexibility, more artistic freedom in the HDR/SDR contents production.

3. BRIEF SUMMARY

In a first aspect, one or more of the present embodiments provide a method comprising: obtaining high dynamic range data: computing a first tone mapping curve from the high dynamic range data corresponding to low high dynamic range values of a combined tone mapping curve, the first tone mapping curve ending by a point, called first point, with an abscissa representative of a high dynamic range diffuse white and an ordinate representative of a standard dynamic range diffuse white, the combined tone mapping curve allowing obtaining standard dynamic range data from the high dynamic range data; and completing the combined tone mapping curve with a second tone mapping curve for high standard dynamic range starting from the first point.

In an embodiment, the second tone mapping curve is a straight line.

In an embodiment, the second tone mapping curve comprises a parabola.

In an embodiment, the method further comprises computing the standard dynamic range data from the high dynamic range data using the combined tone mapping curve.

In an embodiment, the method comprises estimating metadata representative of the combined tone mapping curve.

In an embodiment, computing the first tone mapping curve comprises: obtaining an intermediate tone mapping curve from the high dynamic range data wherein non-linear luminance values of the high dynamic range data smaller than the high dynamic range diffuse white are mapped into non-linear luminance values of the standard dynamic range data: rescaling abscissas of the intermediate tone mapping curve from a range of luminance values of the high dynamic range data between zero and the high dynamic range diffuse white to a range of luminance values of the high dynamic range data between zero and a maximum luminance value of the high dynamic range data; and, mapping ordinates of the intermediate tone mapping curve in a range of luminance values of the standard dynamic range data between zero and a value depending on the standard dynamic range diffuse white to obtain the first tone mapping curve.

In an embodiment, before the mapping, the ordinates of the intermediate tone mapping curve are converted in a perceptual uniform domain wherein converted ordinates values are between zero and a maximum ordinate value corresponding to a maximum luminance value of the standard dynamic range data.

In a second aspect, one or more of the present embodiments provide a device comprising electronic circuitry configured for: obtaining high dynamic range data; computing a first tone mapping curve from the high dynamic range data corresponding to low high dynamic range values of a combined tone mapping curve, the first tone mapping curve ending by a point, called first point, with an abscissa representative of a high dynamic range diffuse white and an ordinate representative of a standard dynamic range diffuse white, the combined tone mapping curve allowing obtaining standard dynamic range data from the high dynamic range data; and completing the combined tone mapping curve with a second tone mapping curve for high standard dynamic range starting from the first point.

In an embodiment, the second curve is a straight line.

In an embodiment, the second curve comprises a parabola.

In an embodiment, the electronic circuitry is further configured for computing the standard dynamic range data from the high dynamic range data using the combined tone mapping curve.

In an embodiment, the electronic circuitry is further configured for estimating metadata representative of the combined tone mapping curve.

In an embodiment, computing the first tone mapping curve comprises:

obtaining an intermediate tone mapping curve from the high dynamic range data wherein non-linear luminance values of the high dynamic range data smaller than the high dynamic range diffuse white are mapped into non-linear luminance values of the standard dynamic range data: rescaling abscissas of the intermediate tone mapping curve from a range of luminance values of the high dynamic range data between zero and the high dynamic range diffuse white to a range of luminance values of the high dynamic range data between zero and a maximum luminance value of the high dynamic range data; and, mapping ordinates of the intermediate tone mapping curve in a range of luminance values of the standard dynamic range data between zero and a value depending on the standard dynamic range diffuse white to obtain the first tone mapping curve.

In an embodiment, the ordinates of the intermediate tone mapping curve are converted in a perceptual uniform domain wherein converted ordinates values are between zero and a maximum ordinate value corresponding to a maximum luminance value of the standard dynamic range data before the mapping.

In a third aspect, one or more of the present embodiments provide a signal generated using the method of the first aspect or by using the device of the second aspect.

In a fourth aspect, one or more of the present embodiments provide a computer program comprising program code instructions for implementing the method according to the first aspect.

In a fifth aspect, one or more of the present embodiments provide a non-transitory information storage medium storing program code instructions for implementing the method according to the first aspect.

4. BRIEF SUMMARY OF THE DRAWINGS

Figure 5:
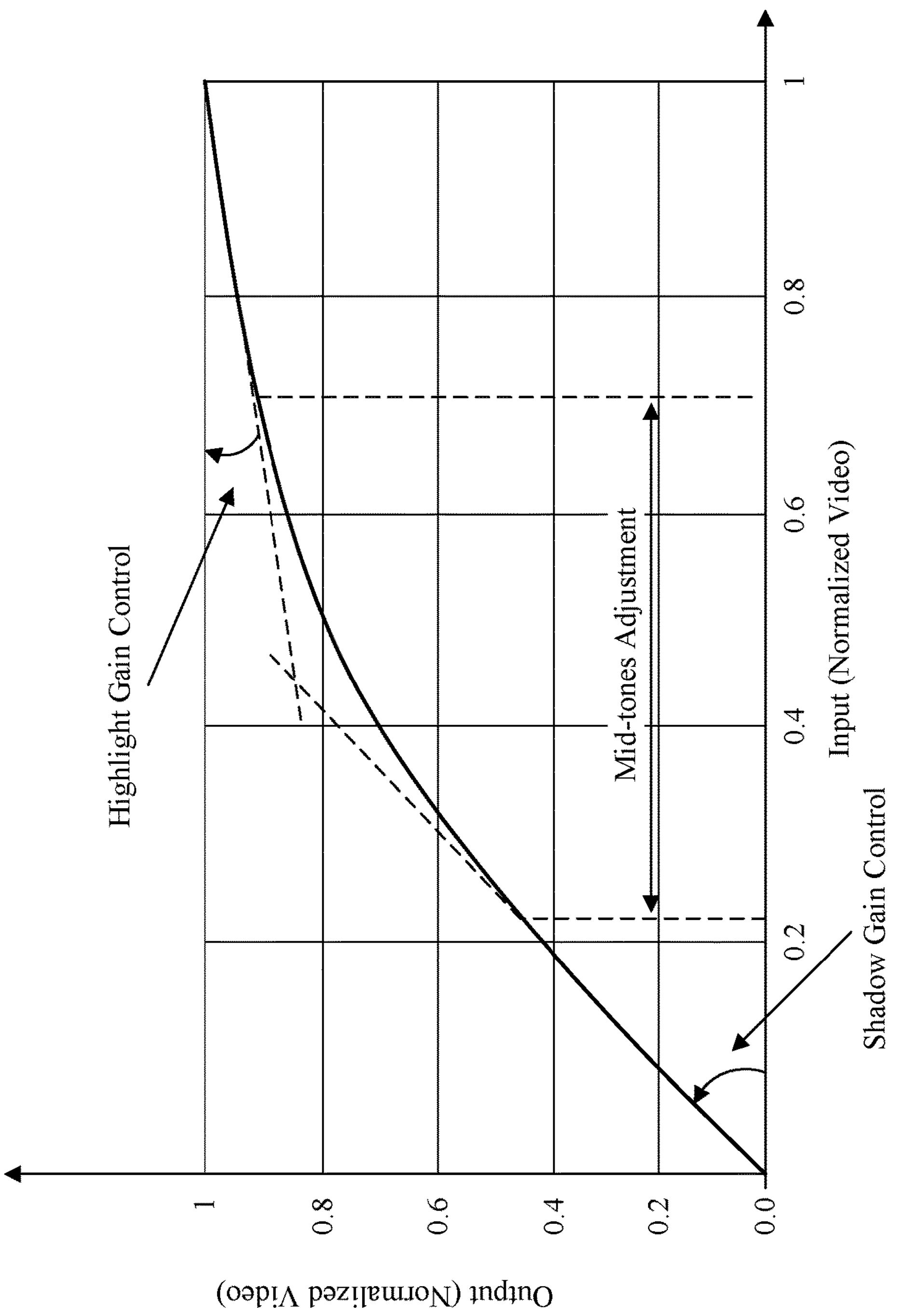
Figure 6:
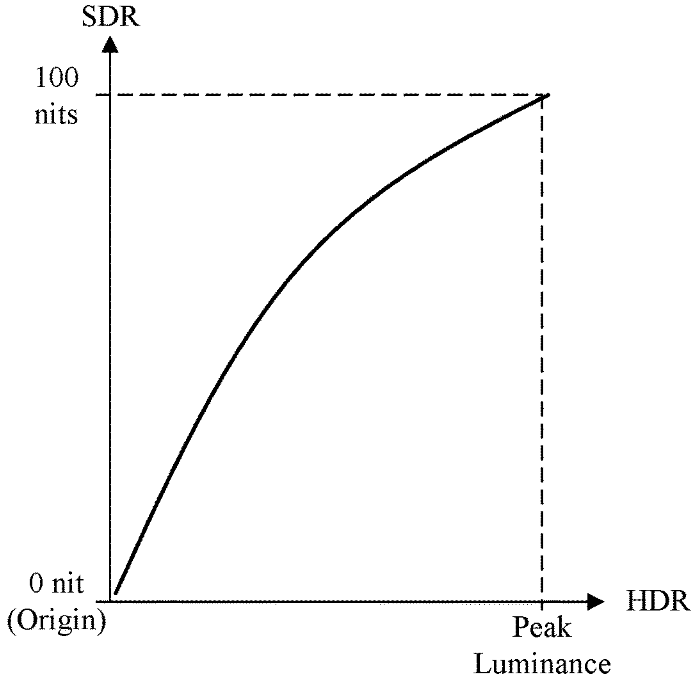
Figure 7:
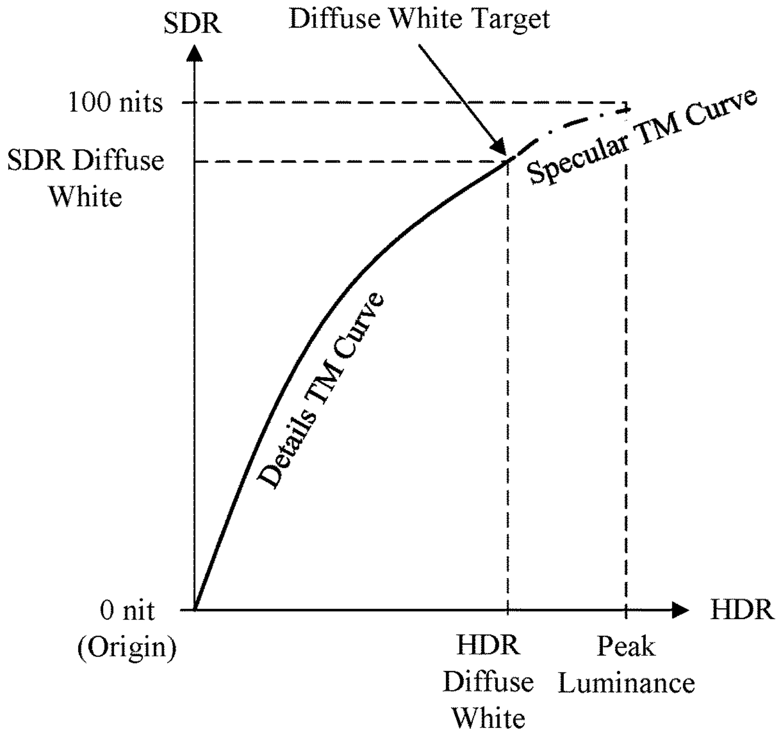
Figure 8:
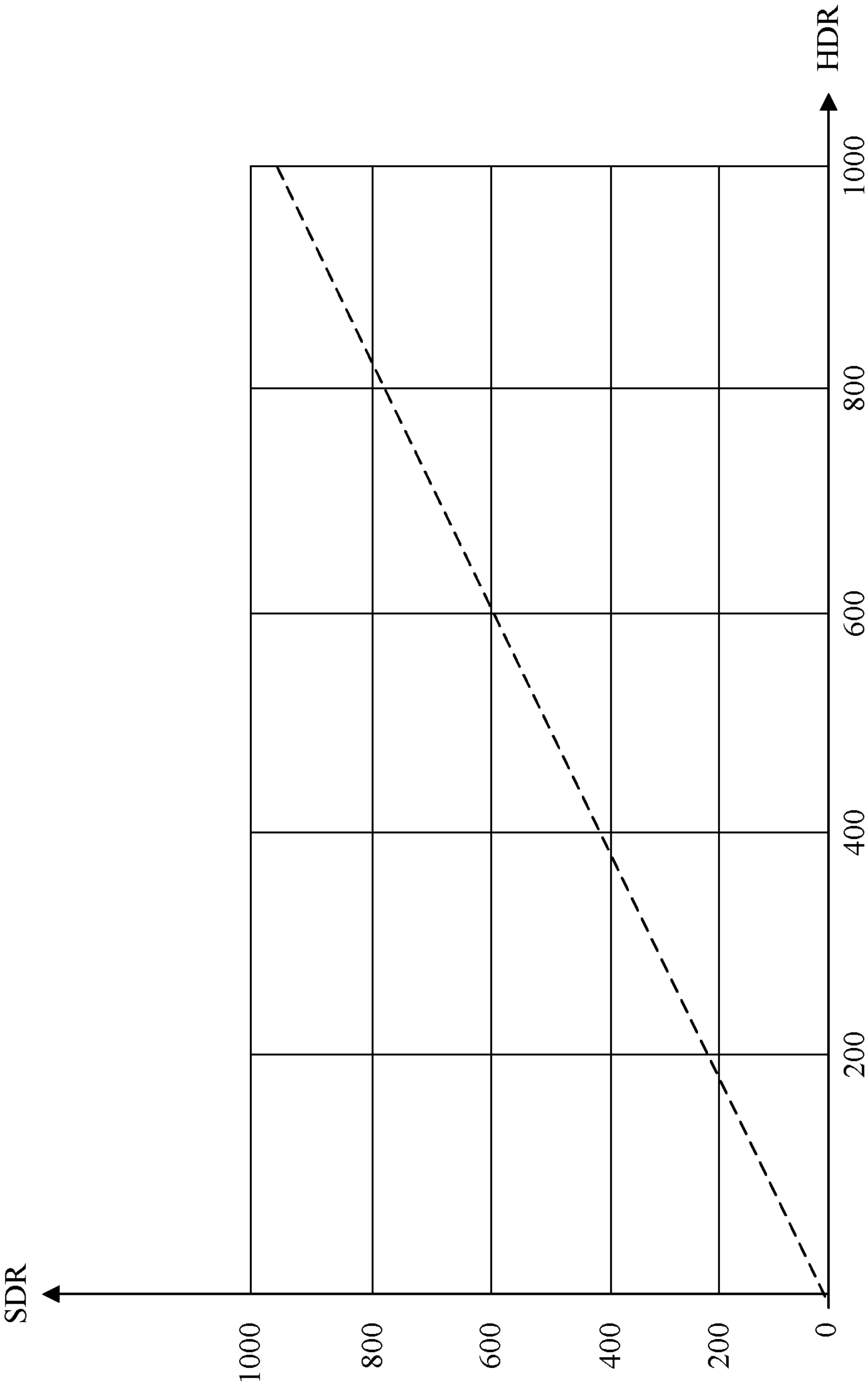
Figure 9:
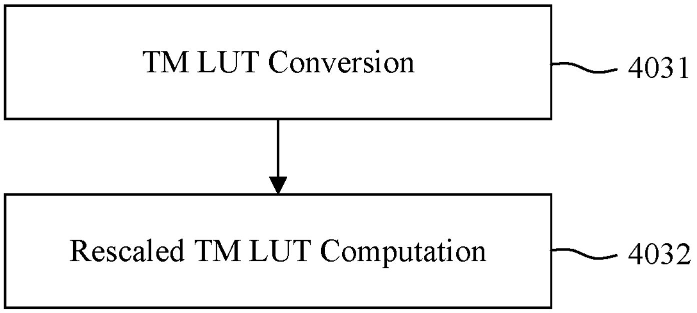

FIG. 5 provides an example of tone mapping curve in the SL-HDR1 context;

FIG. 6 illustrates a tone mapping curve obtained by the tone mapping curve construction method of SL-HDR1;

FIG. 7 illustrates a tone mapping curve obtained by the tone mapping curve construction method of various embodiments:

FIG. 8 provides an example of tone mapping Look-Up Table;

FIG. 9 illustrates schematically details of a rescaling process applied to a tone mapping Look-Up Table.

Figure 10:
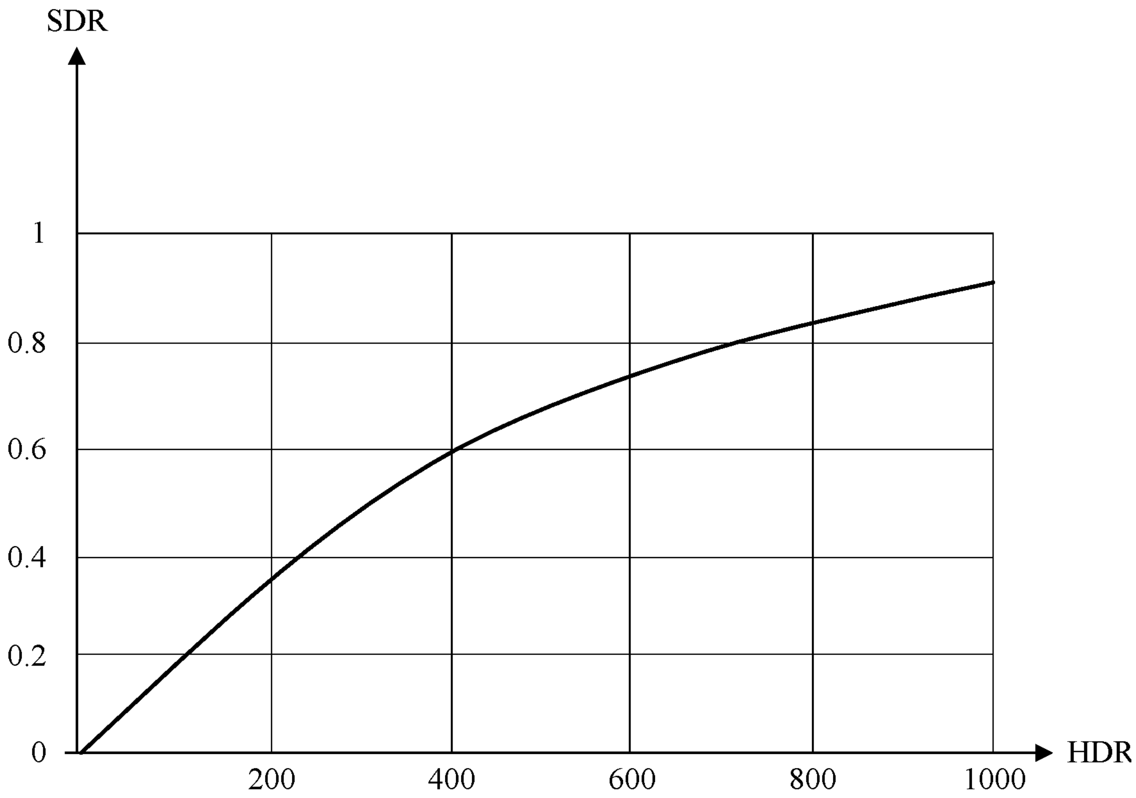
Figure 11:
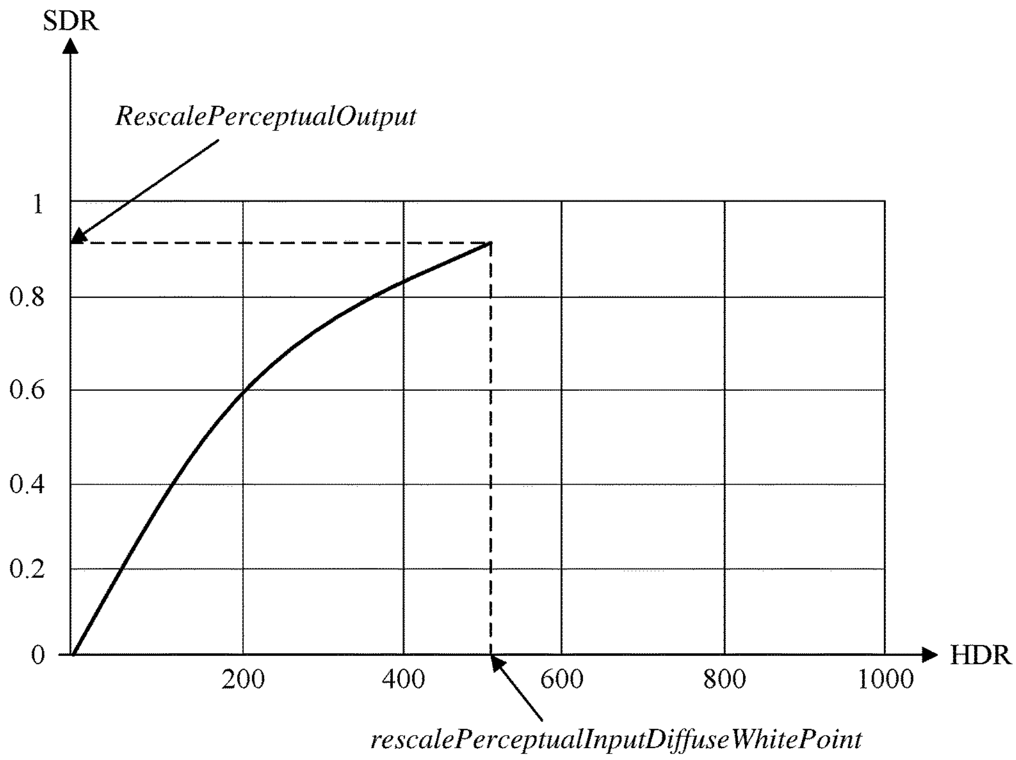
Figure 12:
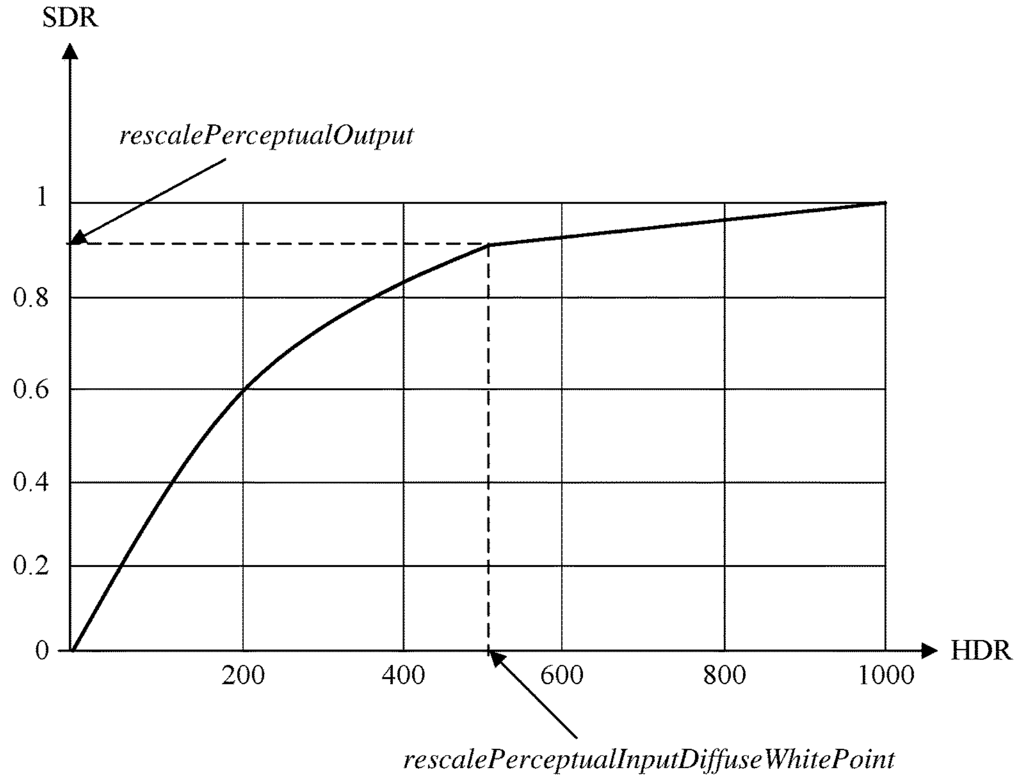
Figure 13:
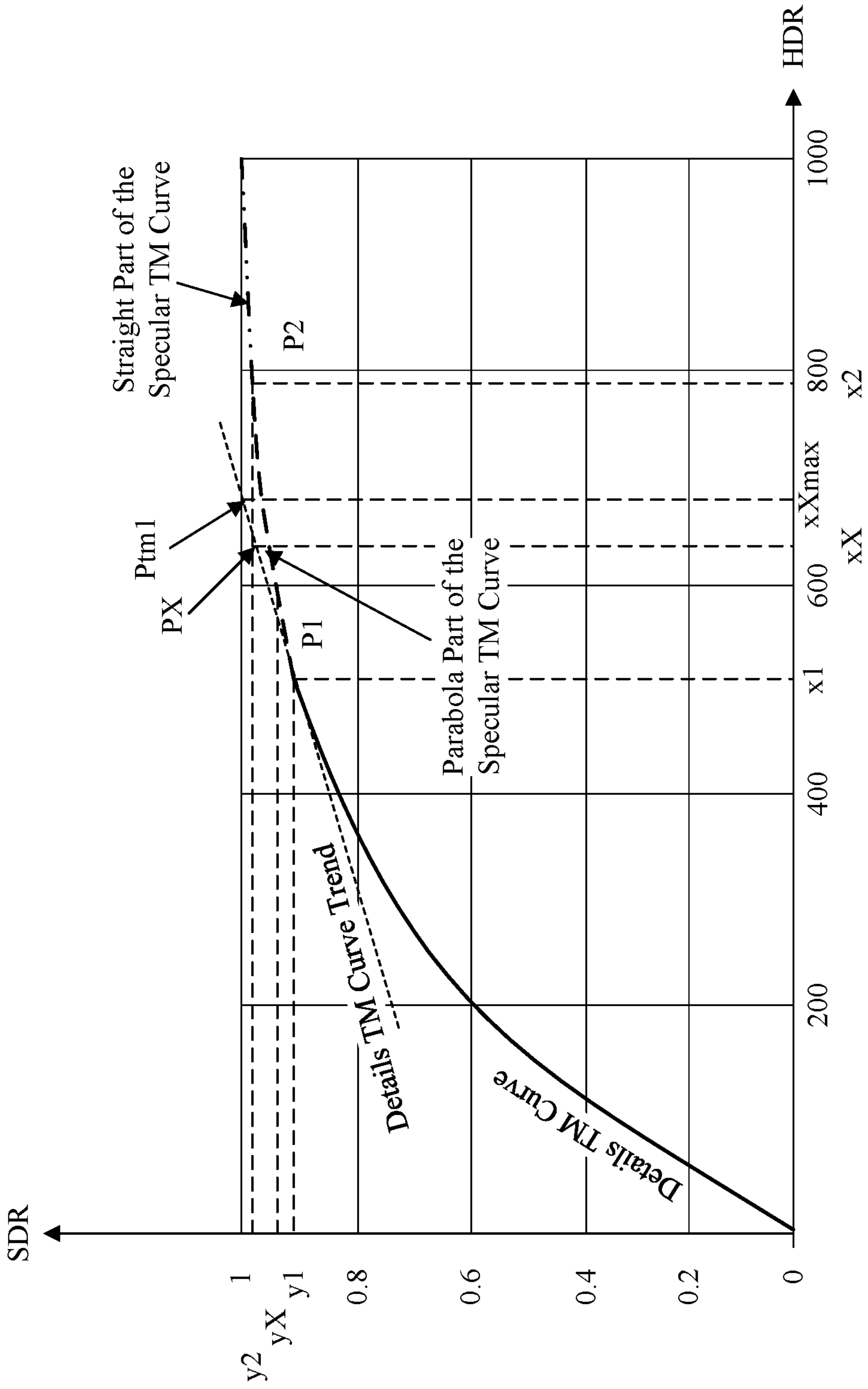
Figure 14:
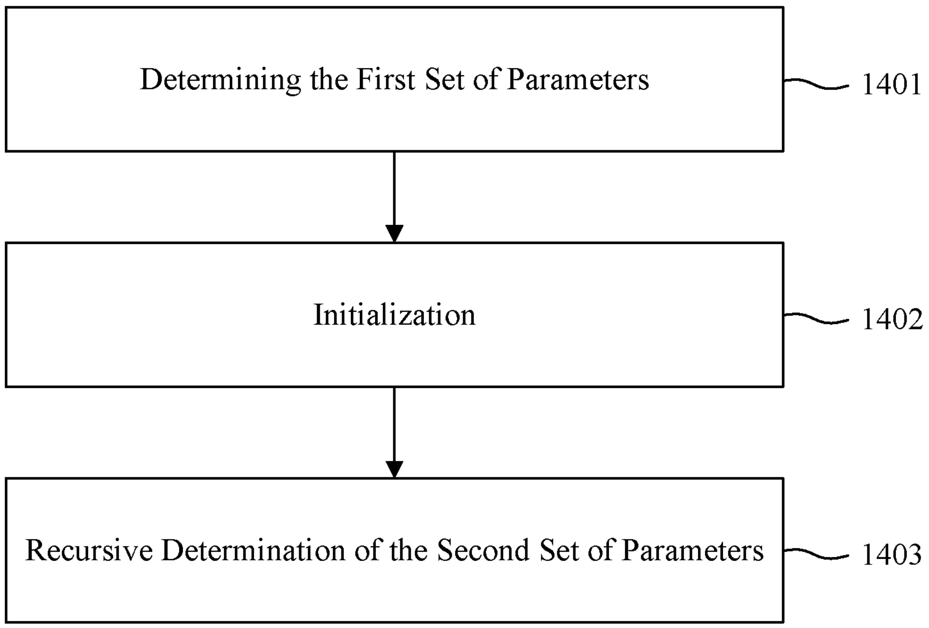

FIG. 10 provides an example of a shape of a tone mapping curve corresponding to a tone mapping look-up table converted in the perceptual uniform domain;

FIG. 11 provides an example of a shape of a tone mapping curve corresponding to a rescaled tone mapping look-up table;

FIG. 12 provides an example of combined TM curve obtained by combining a details TM curve with a specular TM curve implemented using a straight line;

FIG. 13 provides an example of combined TM curve obtained by combining a details TM curve with a specular TM curve implemented using a parabola; and, FIG. 14 illustrates an example of process for determining the luminance mapping variables.

5. DETAILED DESCRIPTION

As mentioned earlier, the BT.2408-3 report proposed some recommendations and in particular a constraint of diffuse white. The diffuse white is defined in BT.2408-3 report as "the white provided by a card that approximates to a perfect reflecting diffuser by being spectrally grey, not just calorimetrically grey, by minimizing specular highlights and minimizing spectral power absorptance". A "perfect reflecting diffuser" is defined as an "ideal isotropic, nonfluorescent diffuser with a spectral radiance factor equal to unity at each wavelength of interest".

In other words, the diffuse white is a luminance level of a video signal that separates:

the scene with all the details, corresponding to the luminance levels that are below the diffuse white;

the speculars: very bright pixels, generally close to white and with very few details, corresponding to the luminance levels that are above the diffuse white level.

Figure 1A:
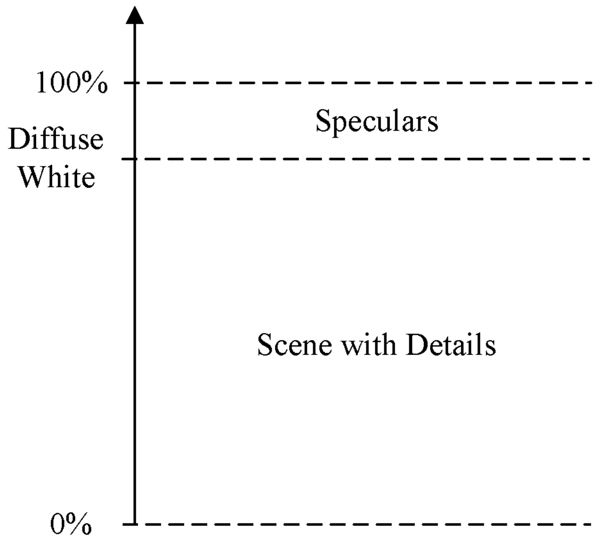
FIG. 1A illustrates a scale of luminance values in which appears the diffuse white.

FIG. 1A illustrates a scale of luminance values in which appears the diffuse white. As can be seen, the diffuse white separates the sets of all possible luminance values in two parts.

The diffuse white concept is valid for HDR signals and for SDR signals.

The BT.2408-3 report specifies that HDR Diffuse White is equal to "203" nits.

However, the "203" nits constraint is only a recommendation and many content producers disagree with that recommendation.

Indeed, this specification brings a major disadvantage: the HDR content is constrained, i.e. for a typical 1000 nits HDR content, only a small amount of the HDR luminance range [0; 203 nits] is dedicated to the details of a scene, while the largest part of the HDR luminance range [203; 1000 nits] is reserved for speculars that bring no detail.

Figure 1B:
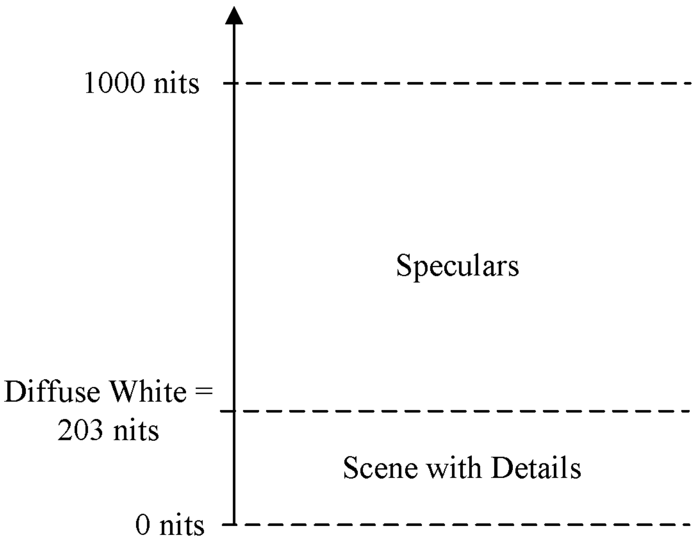
FIG. 1B illustrates the separation of a scale of luminance values when the diffuse white is fixed to "203" nits.

FIG. 1B illustrates the separation of a scale of luminance values when the diffuse white is fixed to "203" nits.

One of the reasons for this restriction is a need for controlled and "very safe" live HDR content production. In addition, this restriction has the following advantages:

the implementation of the conversion from HDR to SDR (i.e. the tone mapping (TM)) is simpler as the HDR diffuse white defined at "203" nits needs to be mapped to SDR diffuse white that is generally defined between 90% and 100% of the maximum SDR value (i.e. between 90 nits and 100 nits). The tone mapping can be therefore implemented using a very basic static 3D-LUTs.

the implementation of the conversion from SDR to HDR, (i.e. the inverse tone mapping (ITM)) is also simpler for the same reason and the inverse tone mapping can also be implemented with very basic static 3D-LUTS.

However, such ratio between the luminance values allocated to the details of the scene and the luminance values allocated to the speculars induced by the diffuse white at "203" nits render the resulting HDR images very dull and not appealing.

The following embodiments allow to get rid of these drawbacks by proposing a system that allows more flexibility and more artistic freedom in the HDR creation and therefore allows obtaining more appealing HDR contents by using:

configurable and dynamic HDR Diffuse White level for HDR to SDR (Tone Mapping);

dynamic conversions for HDR to SDR (Tone Mapping).

Figure 2:
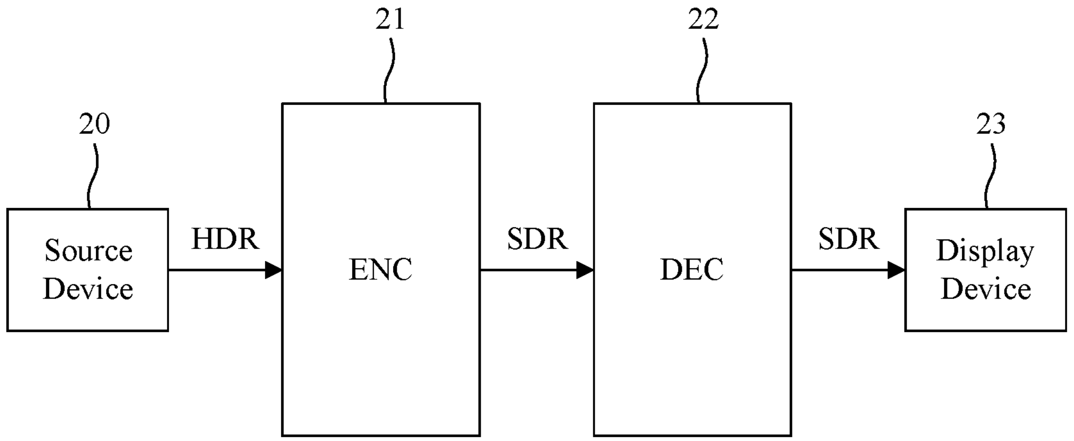
FIG. 2 illustrates schematically a context of various embodiments.

FIG. 2 illustrates an example context in which various embodiments are implemented.

In FIG. 2, A source device 20, that is for instance a HDR camera, generates a HDR video and provides this HDR video to an encoding device 21. The encoding device applies a tone mapping (TM) process to the HDR video to generate a SDR video. The SDR video is then encoded using a video compression standard such for example AVC ((ISO/CEI 14496-10/ITU-T H.264), HEVC (ISO/IEC 23008-2-MPEG-H Part 2, High Efficiency Video Coding/ITU-T H.265)), VVC (ISO/IEC 23090-3-MPEG-I, Versatile Video Coding/ITU-T H.266) or any other video compression standard.

The encoding device 21 provides (transmits via a communication network) a stream comprising the encoded SDR video to a decoding device 22. The decoding device decodes the encoded SDR video and provides the decoded SDR video to a display device 23. The display device 23 is capable to display SDR video.

In another embodiment, the decoding device 22 decodes the encoded SDR video and applies an inverse tone mapping (ITM) process to the decoded SDR video to generate a HDR video. The generated HDR video is then provided to a display device 23 capable of displaying a HDR video. In this embodiment, for instance, the encoding device 21 provides metadata representative of a TM curve along with the SDR data. These metadata help in guiding the ITM process applied by the decoding device 22.

Figure 3A:
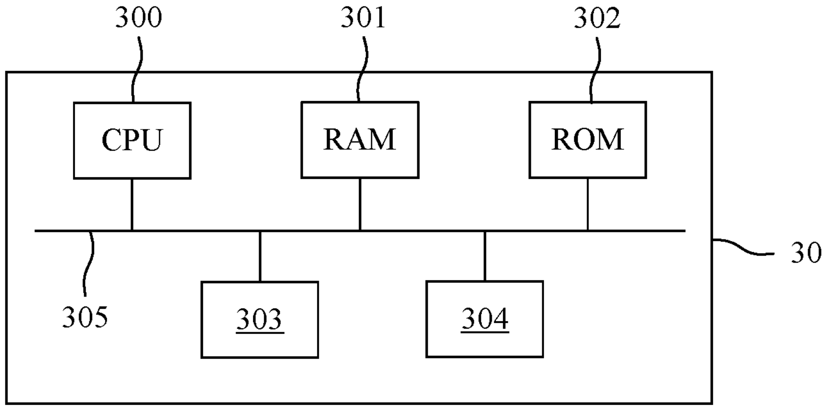
FIG. 3A illustrates schematically an example of hardware architecture of a processing module able to implement various aspects and embodiments.

FIG. 3A illustrates schematically an example of hardware architecture of a processing module 30 able to implement various processes executed by the encoding device 21 or by the decoding device 22. For instance, the processing module 30 is adapted to implement the process described later in relation to FIG. 4. The processing module 30 comprises, connected by a communication bus 305: a processor or CPU (central processing unit) 300 encompassing one or more microprocessors, general purpose computers, special purpose computers, and processors based on a multi-core architecture, as non-limiting examples: a random access memory (RAM) 301: a read only memory (ROM) 302: a storage unit 303, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device: at least one communication interface 304 for exchanging data with other modules, devices or equipment. The communication interface 304 can include, but is not limited to, a transceiver configured to transmit and to receive data over communication channel. The communication interface 304 can include, but is not limited to, a modem or network card.

If the processing module 30 implements a process of the encoding device 21, the communication interface 304 enables for instance the processing module 30 to receive a HDR video and to provide a stream comprising an encoded SDR video. If the processing module 30 implements a process of the decoding device 22, the communication interface 304 enables for instance the processing module 30 to receive an stream comprising an encoded SDR video and to provide decoded SDR video or a HDR video.

The processor 300 is capable of executing instructions loaded into the RAM 301 from the ROM 302, from an external memory (not shown), from a storage medium, or from a communication network. When the processing module 30 is powered up, the processor 300 is capable of reading instructions from the RAM 301 and executing them. These instructions form a computer program causing, for example, the implementation by the processor 300 of a process of the encoding device 21 as described later in relation with FIG. 4 or a process of the decoding device 22.

All or some of the algorithms and steps of process executed by the encoding device 21 or by the decoding device 22 may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 3B:
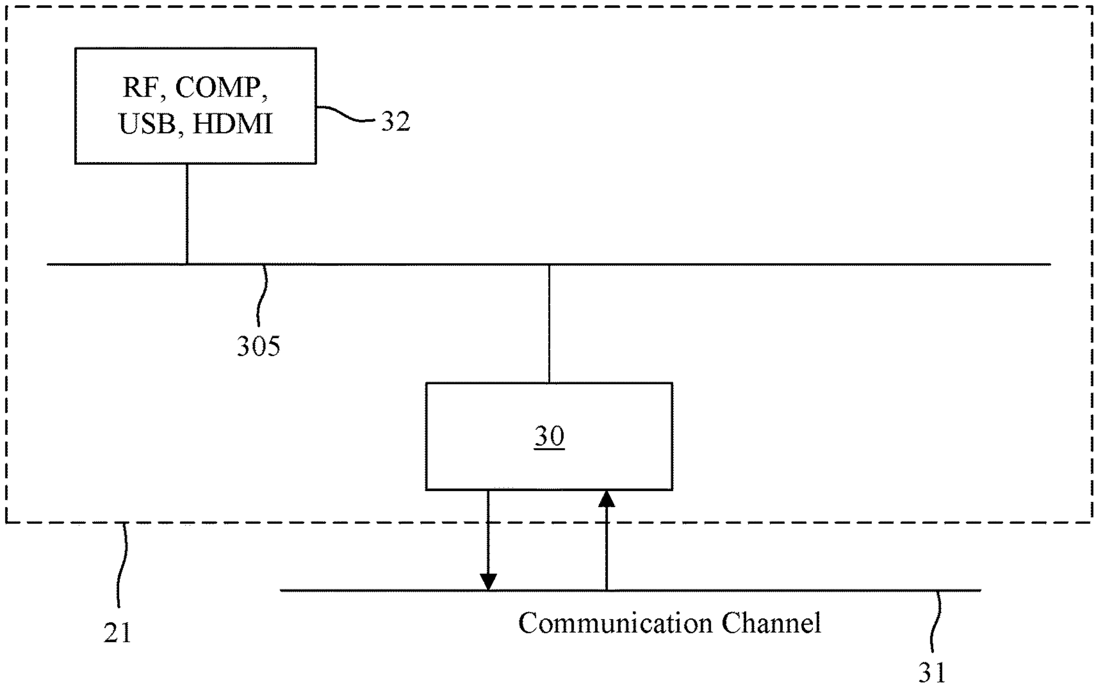
FIG. 3B illustrates a block diagram of an example of a first system in which various aspects and embodiments are implemented.
Figure 3C:
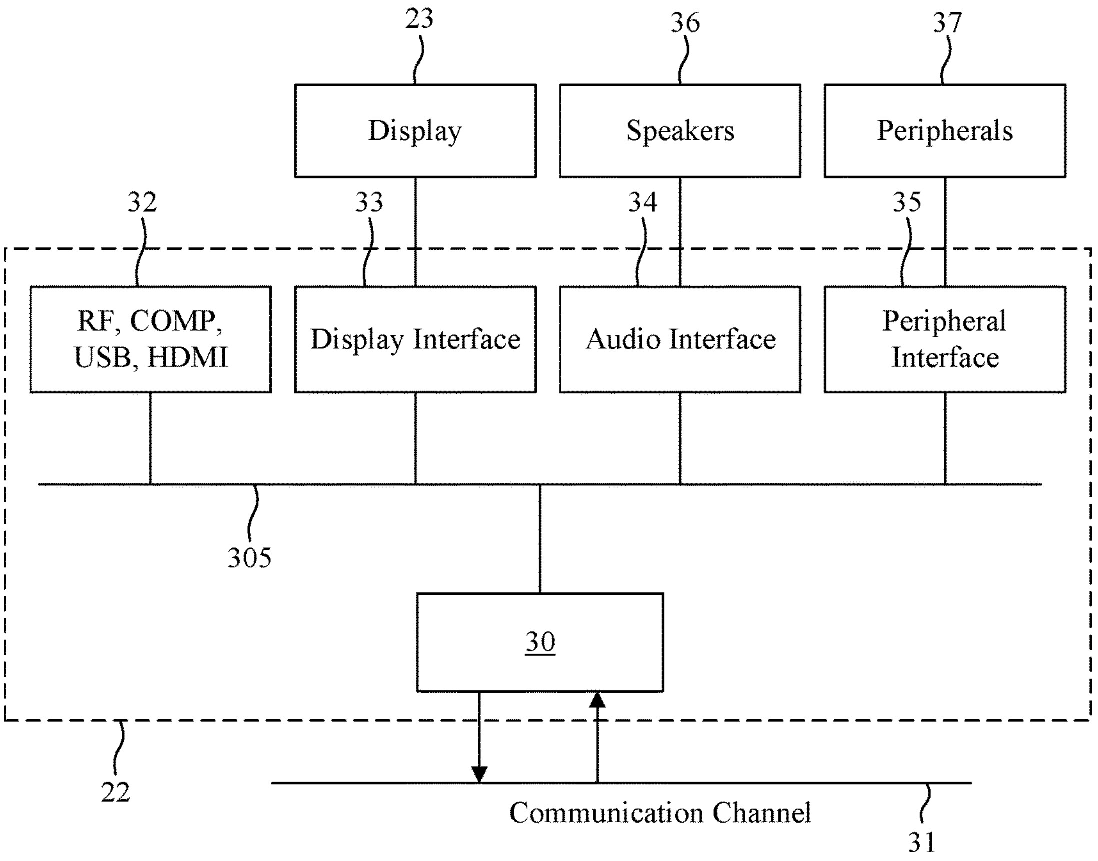
FIG. 3C illustrates a block diagram of an example of a second system in which various aspects and embodiments are implemented.

FIG. 3C illustrates a block diagram of an example of a decoding device 22 in which various aspects and embodiments can be implemented. Decoding device 22 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems and connected home appliances. Elements of decoding device 22, singly or in combination, can be embodied in a single integrated circuit (IC), multiple ICs, and/or discrete components. For example, in at least one embodiment, the decoding device 22 comprises one processing module 30 that implement a decoding module or an ITM module. But, in another embodiment, the decoding device 22 can comprise a first processing module 30 implementing a decoding module and a second processing module 30 implementing an ITM module or one processing module 30 implementing a decoding module and an ITM module. In various embodiments, the decoding device 22 is communicatively coupled to one or more other systems, or other electronic devices, via, for example, a communications bus or through dedicated input and/or output ports. In various embodiments, the decoding device 22 is configured to implement one or more of the aspects described in this document.

The decoding device 22 comprises at least one processing module 30 capable of implementing one decoding module.

The input to the processing module 30 can be provided through various input modules as indicated in input block 32. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 3C, include composite video.

In various embodiments, the input modules of input block 32 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting decoding device 22 to other electronic devices across USB and/or HDMI connections. It is to be understood that various aspects of input processing, for example, Reed-Solomon error correction, can be implemented, for example, within a separate input processing IC or within the decoding device 22 as necessary. Similarly, aspects of USB or HDMI interface processing can be implemented within separate interface ICs or within the processing module 30 as necessary. A demodulated, error corrected, and demultiplexed stream is provided to the processing module 30.

Various elements of decoding device 22 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the decoding device 22, the processing module 30 is interconnected to other elements of said decoding device 22 by the bus 305.

The communication interface 304 of the processing module 30 allows the decoding device 22 to communicate on a communication channel 31. The communication channel 31 can be implemented, for example, within a wired and/or a wireless medium.

Data is streamed, or otherwise provided, to the decoding device 22, in various embodiments, using a wireless network such as a Wi-Fi network, for example IEEE 802.11 (IEEE refers to the Institute of Electrical and Electronics Engineers). The Wi-Fi signal of these embodiments is received over the communications channel 31 and the communications interface 304 which are adapted for Wi-Fi communications. The communications channel 31 of these embodiments is typically connected to an access point or router that provides access to external networks including the Internet for allowing streaming applications and other over-the-top communications. Other embodiments provide streamed data to the decoding device 22 using a set-top box that delivers the data over the HDMI connection of the input block 32. Still other embodiments provide streamed data to the decoding device 22 using the RF connection of the input block 32. As indicated above, various embodiments provide data in a non-streaming manner. Additionally, various embodiments use wireless networks other than Wi-Fi, for example a cellular network or a Bluetooth network.

The decoding device 22 can provide an output signal to various output devices, including the display device 23, speakers 36, and other peripheral devices 37. The display device 23 of various embodiments includes one or more of, for example, a touchscreen display, an organic light-emitting diode (OLED) display, a curved display, and/or a foldable display. The display device 23 can be for a television, a tablet, a laptop, a cell phone (smartphone), or other devices. The display device 23 can also be integrated with other components (for example, as in a smartphone), or separate (for example, an external monitor for a laptop). The other peripheral devices 37 include, in various examples of embodiments, one or more of a stand-alone digital video disc (or digital versatile disc) (DVR, for both terms), a disk player, a stereo system, and/or a lighting system. Various embodiments use one or more peripheral devices 37 that provide a function based on the output of the decoding device 22. For example, a disk player performs the function of playing the output of the decoding device 22.

In various embodiments, control signals are communicated between the decoding device 22 and the display device 23, speakers 36, or other peripheral devices 37 using signaling such as AV.Link, Consumer Electronics Control (CEC), or other communications protocols that enable device-to-device control with or without user intervention. The output devices can be communicatively coupled to decoding device 22 via dedicated connections through respective interfaces 33, 34, and 35. Alternatively, the output devices can be connected to decoding device 22 using the communications channel 31 via the communications interface 304. The display device 23 and speakers 36 can be integrated in a single unit with the other components of decoding device 22 in an electronic device such as, for example, a television. In various embodiments, the display interface 33 includes a display driver, such as, for example, a timing controller (T Con) chip.

The display device 23 and speaker 36 can alternatively be separate from one or more of the other components, for example, if the RF module of input 32 is part of a separate set-top box. In various embodiments in which the display device 23 and speakers 36 are external components, the output signal can be provided via dedicated output connections, including, for example, HDMI ports, USB ports, or COMP outputs.

FIG. 3B illustrates a block diagram of an example of the encoding device 21 in which various aspects and embodiments are implemented. The encoding device 21 is very similar to decoding device 22. The encoding device 21 can be embodied as a device including the various components described below and is configured to perform one or more of the aspects and embodiments described in this document. Examples of such devices include, but are not limited to, various electronic devices such as personal computers, laptop computers, smartphones, tablet computers, a camera and a server. Elements of encoding device 21, singly or in combination, can be embodied in a single integrated circuit (IC), multiple ICs, and/or discrete components. For example, in at least one embodiment, the encoding device 21 comprises one processing module 30 that implements a process of the encoding device 21. In various embodiments, the encoding device 21 is communicatively coupled to one or more other systems, or other electronic devices, via, for example, a communications bus or through dedicated input and/or output ports. In various embodiments, the encoding device 21 is configured to implement one or more of the aspects described in this document.

The input to the processing module 30 can be provided through various input modules as indicated in input block 32 already described in relation to FIG. 3C.

Various elements of encoding device 21 can be provided within an integrated housing. Within the integrated housing, the various elements can be interconnected and transmit data therebetween using suitable connection arrangements, for example, an internal bus as known in the art, including the Inter-IC (12C) bus, wiring, and printed circuit boards. For example, in the encoding device 21, the processing module 30 is interconnected to other elements of said encoding device 21 by the bus 305.

The communication interface 304 of the processing module 30 allows the encoding device 21 to communicate on the communication channel 31.

Data is streamed, or otherwise provided, to the encoding device 21, in various embodiments, using a wireless network such as a Wi-Fi network, for example IEEE 802.11 (IEEE refers to the Institute of Electrical and Electronics Engineers). The Wi-Fi signal of these embodiments is received over the communications channel 31 and the communications interface 304 which are adapted for Wi-Fi communications. The communications channel 31 of these embodiments is typically connected to an access point or router that provides access to external networks including the Internet for allowing streaming applications and other over-the-top communications. Other embodiments provide streamed data to the encoding device 21 using the RF connection of the input block 32.

As indicated above, various embodiments provide data in a non-streaming manner. Additionally, various embodiments use wireless networks other than Wi-Fi, for example a cellular network or a Bluetooth network.

The data provided to the encoding device 21 are generally a raw HDR video provided for example by the HDR camera 20 connected to the encoding device 21.

The encoding device 21 can provide an output signal to various output devices capable of storing and/or decoding the output signal such as the decoding device 22.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction.

Various implementations involve encoding. In an analogous way to the above discussion about "decoding", "encoding" as used in this application can encompass all or part of the processes performed, for example, on an input RAW SDR video in order to produce an encoded SDR video stream. In various embodiments, such processes include one or more of the processes typically performed by an encoder, for example, partitioning, prediction, transformation, quantization, and entropy encoding.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded SDR video. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Various embodiments may refer to a bitstream. Bitstreams include, for example, any series or sequence of bits, and do not require that the data bits be, for example, transmitted, received, or stored.

Some of the following embodiments relates to a construction of a tone mapping curve. A method for constructing a tone mapping curve along with variables defining this curve is detailed in section 7.2.3.1 of the specification ETSI TS 103 433-1 v1.4.1, High-Performance Single Layer High Dynamic Range (HDR) System for use in Consumer Electronics devices: Part 1: Directly Standard Dynamic Range (SDR) Compatible HDR System (SL-HDR1), August 2021, called SL-HDR1 in the following.

FIG. 5 provides an example of tone mapping curve in the SL-HDR1 context.

The tone mapping curve is applied in a perceptually-uniform domain and is a piece-wise curve comprising three parts:

- A bottom section: the bottom section is linear and its steepness is determined by a parameter shadowGain.
- A upper section: the upper section is also linear, and its steepness is determined by a parameter highlightGain.
- A mid-section: The mid-section is a parabola providing a smooth bridge between the two linear sections. The width of the cross-over is determined by a parameter midToneWidthAdjFactor.

The example of tone mapping curve of FIG. 3 result of a method for constructing a tone mapping curve that does not consider the HDR Diffuse White, nor the SDR Diffuse White.

The main constraints followed by the TM curve construction method described in SL-HDR1 is:

- to map the HDR null luminance value (0 nit) to the SDR min value (0 nit), defined as the origin point;
- to map the HDR Peak Luminance value (i.e. the maximum HDR luminance value) to the SDR max value (100 nits), defined as the max target point;
- to define a TM curve between the origin and the max target.

FIG. 6 illustrates a tone mapping curve obtained by the TM curve construction method of SL-HDR1.

In the TM curve construction method proposed in the following embodiments, the HDR diffuse white and the SDR diffuse white are considered with the following two additional constraints:

- the HDR Diffuse White value that is always less or equal to the HDR peak luminance;
- the SDR Diffuse White value that is always less or equal to the SDR max value (100 nits).

The principles of the new TM curve construction method is:

- to map the HDR null luminance value (0 nit) to the SDR min value (0 nit), defined as the origin point (same as for the TM curve construction method of SL-HDR1);
- to map the HDR diffuse white value (0<HDR Diffuse White<HDR peak luminance) to the SDR diffuse white value (0<SDR Diffuse White<SDR max value), defined as the diffuse white target;
- to define a TM curve between the origin and the diffuse white target. This TM curve construction method of SL-HDR1 is used with a slight modification consisting in replacing the max target point by the diffuse White target point, i.e.:

the HDR Peak Luminance value is replaced by the HDR diffuse white value that is a new input parameter;

The SDR Max value (100 nits) is replaced by the SDR diffuse white value that is a new input parameter:

to define a specular mapping curve between the diffuse white target and the max target. The corresponding pixels correspond to the specular part of the content.

FIG. 7 illustrates a tone mapping curve obtained by the TM curve construction method of various embodiments.

In the following, tone mapping curve obtained by the TM curve construction method of various embodiments is called a combined TM curve. As can be seen in the example of combined TM curve of FIG. 7, this combined TM curve is composed of two parts: a first part called details TM curve and a second part called specular TM curve. The details TM curve is responsible of the mapping of the details of the pictures. The details TM curve is between the origin point (0,0) and the diffuse white target starting point. The specular TM curve is responsible of the mapping of the speculars of the pictures. The specular TM curve can be of any shape: a straight line, a curve, a parabola, etc. The only constraints of the specular TM curve are to start at the diffuse white target starting point and to end at the max target ending point. It is considered that, comparing to a regular TM curve, the combined TM mapping curve uses a new control points: the diffuse white target starting point.

Figure 4:
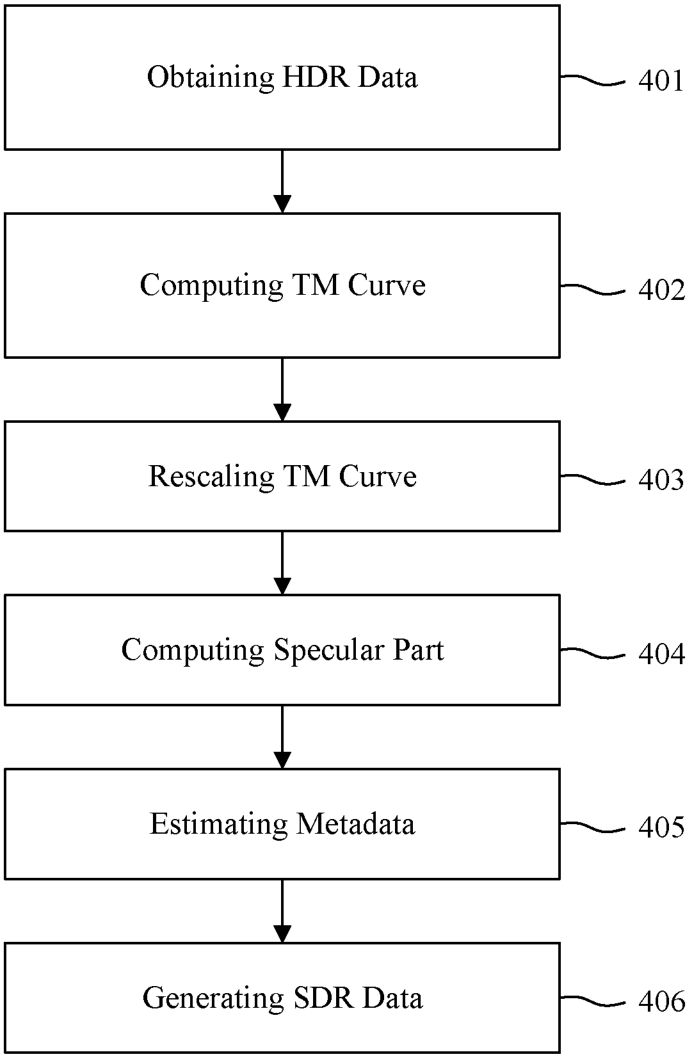
FIG. 4 illustrates an example of tone mapping curve construction method of various embodiments.

FIG. 4 illustrates an example of tone mapping curve construction method of various embodiments. The method of FIG. 4 is for example executed by the processing module 30 of the encoding device 21.

In a step 401, the processing module 30 obtains HDR data representative of an HDR video content. The HDR data are for instance a raw HDR video content.

Step 401, is followed by steps 402 and 403 wherein the processing module 30 computes a details TM curve as represented in relation to FIG. 7 from the HDR data.

In step 402, the processing module 30 computes a TM curve from the HDR data.

In an embodiment, step 402 reuse a variant of the TM curve construction method of SL-HDR1. The original TM curve construction method of SL-HDR1 uses the maximum Peak Luminance of the HDR data as the HDR maximum value and maps this maximum Peak Luminance value of the HDR data to the SDR maximum value, i.e. "100" nits.

In the variant of the TM curve construction method of SL-HDR1, the HDR maximum Peak Luminance value is replaced by the HDR Diffuse White value, meaning that now the TM curve construction method maps the HDR Diffuse White value to the SDR maximum value. In that case, HDR values higher than the HDR diffuse white can be ignored or set to the HDR diffuse white value. In other words, the variant of the TM curve construction method of SL-HDR1 is identical to the TM curve construction method of SL-HDR1 in all its characteristics except in the fact that the maximum Peak Luminance value is replaced by the HDR Diffuse White value.

An output of this variant is a Tone Mapping LUT in the gamma 2.4 domain, i.e. the Tone Mapping LUT maps the non-linear luminance values (gamma 2.4) of the HDR data into the non-linear luminance values (gamma 2.4) of SDR data. An example of the shape of a TM curve corresponding to such a LUT is given by FIG. 8. In the example of FIG. 8, the TM LUT is a 1001-entry LUT:

the abscissa ranges from "0" to "1000", each entry representing ((HDR luminance value in nits)/(HDR Diffuse White value in nits)) 2.4*1000. In other words, each entry of the TM LUT in the range [0:1000] smaller or equal to the HDR diffuse white is representative of a HDR value in [0; HDR diffuse white].

the ordinate ranges from "0" to "1023", each value representing ((SDR luminance value in nits)/(SDR maximum value in nits)) 2.4*1023. The SDR luminance values remains in the range [0; SDR maximum value].

In a step 403, the processing module 30 applies a rescaling to the TM curve computed in step 402.

Rescaling the TM curve amounts in rescaling the abscissas of the TM LUT from [0; HDR diffuse white] to [0; HDR peak luminance] (i.e. the range of HDR values is extended from [0; HDR diffuse white] to [0; HDR peak luminance]) while keeping the ordinates in [0; SDR maximum value] by adding the SDR diffuse white constraint.

FIG. 9 illustrates schematically details of the rescaling process applied in step 403.

In a step 4031, the processing module 30 converts the TM LUT in the perceptual uniform domain. To do so, for each abscissa value i between "0" and LUTSize=1001 (i.e. i E [0; LUTSize−1]), a converted ordinate SDR_PU_Y[i] is computed as follows:

$$\text{SDR\_nits} = \left(\frac{TMLUT[i]}{1023}\right)^{2.4} \times \text{PeakSDRLuminance}$$

$$\text{SDR\_PU\_Y}[i] = SdrOETF\left(\frac{\text{SDR\_nits}}{\text{PeakSDRLuminance}}\right)$$

With:

PeakSDRLuminance: Maximum SDR Luminance=100 nits;

SdrOETF(·) being a function that converts a linear SDR value Yin into a SDR perceptual domain value. For example:

$\text{SdrOETF(Yin)}=\log(32\cdot(100/10000)^{(1/2.4)}(\text{Yin})^{(1/2.4)}+1)/\log(32\cdot(100/10000)^{(1/2.4)}+1)$ LUTSize−1 corresponds to the HDR diffuse white value;

The SDR_PU_Y [i] ordinate ranges from "0" to "1", the maximum value "1" corresponding to the maximum SDR Luminance value=100 nits.

FIG. 10 provides an example of a shape of a TM curve corresponding to a TM LUT converted in the perceptual uniform domain.

In a step 4032, the processing module 30 computes the rescaled TM LUT from the converted TM LUT. In other words, the rescaled TM LUT is a rescaled version of the converted TM LUT in which:

the rescaled TM LUT abscissa ranges from "0" to (LUTSize−1), the abscissa value (LUTSize−1) corresponding to the HDR Peak Luminance value (i.e. the maximum luminance value of the HDR data);

the rescaled ordinates range from "0" to "1", the maximum value "1" corresponding to maximum SDR luminance (=100 nits);

the maximum value of the converted TM LUT abscissa, corresponding to the HDR Diffuse White value now maps to an integer abscissa rescalePerceptualInputDiffuseWhitePoint, computed as follows:

$\text{rescalePerceptualInputDiffuseWhitePoint}=\text{HDR\_Diffuse\_White}/\text{maximum Peak Luminance})^{(1/2.4)}*\text{LUTSize}+0.5;$ where HDR_Diffuse_White is a value of the HDR diffuse white.

The maximum value of the converted TM LUT ordinate, corresponding to maximum SDR luminance value ("100" nits) now maps to an ordinate rescalePerceptualOutput, rescalePerceptualOutput being computed as follows:

$$rescalePerceptualOutput=SdrOETF((SDR\_Diffuse\_White/100)^{(1/2.4)}).$$

Each value of the rescaled TM LUT ordinate SDR_PU_Y rescaled[i] from abscissa i=0 to (rescalePerceptualInputDiffuseWhitePoint−1) is computed as follow:

$$curRescalePerceptualInput=(i/rescalePerceptualInput);$$

$$SDR\_PU\_Y\_rescaled[i]=SDR\_PU\_Y[curRescalePerceptualInput]*rescalePerceptualOutput.$$

with rescalePerceptualInput=(HDR Diffuse White/maximum Peak Luminance)$^{(1/2.4)}$).

As can be seen, the converted ordinates SDR_PU_Y[i] are mapped in a [0; rescalePerceptualOutput] to obtain SDR_PU_Y_rescaled[i].

FIG. 11 provides an example of a shape of a TM curve corresponding to a rescaled TM LUT.

As can be seen in FIG. 11, the details TM curve, corresponding to low SDR (and HDR) values of the combined TM curve, is ending by a point of highest SDR value with an abscissa representative of a HDR diffuse white (i.e. rescalePerceptualInputDiffuseWhitePoint) and an ordinate representative of the SDR diffuse white (i.e. rescalePerceptualOutput).

In a step 404, the processing module 30 completes the rescaled TM LUT for the abscissas between rescalePerceptualInputDiffuseWhitePoint and (LUTSize−1) and for the ordinates between an ordinate rescalePerceptualOutput and "1". In other words, the processing module completes the current rescaled TM LUT that represents only the details TM curve with a part that represent a specular TM curve.

Before completing the rescaled TM LUT, the processing module 30 corrects the abscissa rescalePerceptualInputDiffuseWhitePoint and the ordinate rescalePerceptualOutput if necessary.

Regarding the abscissa rescalePerceptualInputDiffuseWhitePoint, if the last values of the already computed values of the rescaled TM LUT are all equal, i.e. the rescaled TM LUT computed in step 4032 ends with a horizontal straight line until rescalePerceptualInputDiffuseWhitePoint, this straight line needs to be removed. This is done by updating the abscissa rescalePerceptualInputDiffuseWhitePoint. The updating consists in iterating through the ordinates SDR_PU_Y_rescaled[i] of the rescaled TM LUT one by one in reverse order from the abscissa i=rescalePerceptualInputDiffuseWhitePoint until finding a value of abscissa i for which the value of the ordinate is different from the value of the ordinate corresponding to the next value (i−1) of the abscissa (i.e. SDR_PU_Y_rescaled [i]≠SDR_PU_Y rescaled[i−1])).

Regarding the ordinate rescalePerceptualOutput, if the maximum value of the ordinates of the rescaled TM LUT does not reach the maximum value (i.e. "1"), then the ordinate SDR_PU_Y_rescaled[rescalePerceptualInputDiffuseWhitePoint−1] is lower than the theoretical ordinate rescalePerceptualOutput value computed above. Therefore, rescalePerceptualOutput needs to be updated as follow:

$$rescalePerceptualOutput=\min(rescalePerceptualOutput, SDR\_PU\_Y\_rescaled[rescalePerceptualInputDiffuseWhitePoint-1])$$

where min (x,y) takes the minimum value between x and y.

The specular TM curve can be of any shape: a straight line, a curve, a parabola, etc.

In the following, we give two examples of specular TM curves: a straight line and a parabola:

Specular TM Curve Implemented Using a Straight Line:

The details TM curve ends at point (rescalePerceptualInputDiffuse WhitePoint−1, rescalePerceptualOutput), renamed P1 (x1, y1) with:

x1=rescalePerceptualInputDiffuse WhitePoint−1;

y1=rescalePerceptualOutput.

The specular TM curve is represented by a straight line between P1 and the last point of the rescaled TM LUT SDR_PU_Y_rescaled (i.e. LUTSize−1],1). A specular TM LUT m_PerceptualDiffuseWhiteLUTY[i] corresponding to the specular TM curve is computed for each abscissa i between rescalePerceptualInputDiffuseWhitePoint and LUTSize (i.e. i∈[rescalePerceptualInputDiffuseWhitePoint: LUTSize−1] as follows:

$$m\_PerceptualDiffuseWhiteLUTY[i] = rescalePerceptualOutput + (i - rescalePerceptualInputDiffuseWhitePoint) * specularStep.$$

where specularStep=(1−rescalePerceptualOutput)/(LUTSize−1−rescalePerceptualInputDiffuseWhitePoint).

FIG. 12 provides an example of combined TM curve obtained by combining a details TM curve with a specular TM curve implemented using a straight line.

Specular TM Curve Implemented Using a Parabola:

Again, the details TM curve ends at point (rescalePerceptualInputDiffuseWhitePoint−1, rescalePerceptualOutput), renamed P1 (x1, y1) with:

x1=rescalePerceptualInputDiffuseWhitePoint−1;

y1=rescalePerceptualOutput.

The trend at the end the details TM curve can be represented by a straight line with the following formulae:

$$(Dtm)\ Ytm = atm.x + btm;$$

It is considered that the specular TM curve is made of two parts:

- a straight line between a point P2 (x2, y2) and the last point of the rescaled TM LUT SDR_PU_Y_rescaled (i.e. LUTSize−1, 1) with the following formulae: (Ds) $y=as\cdot x+bs$;
- A parabola between points P1 and P2 with the following formulae: (Ps) $y=ap\cdot x^2+bp\cdot x+cp$.

FIG. 13 provides an example of combined TM curve obtained by combining a details TM curve with a specular TM curve implemented using a parabola.

In FIG. 13:

- Ptm1 is a crossing point between (Dtm) and a straight line (Dy1): y=1, with abscissa xXmax.
- PX is a crossing point between (Dtm) and (Ds), abscissa xX of point PX is the middle of [x1; x2].

The trend atm of (Dtm) can be computed from the last already computed values of the rescaled TM LUT SDR_PU_Y rescaled.

For instance, the trend atm can be computed:

with the two last points: atm=SDR_PU_Y_rescaled [x1−1]−SDR_PU_Y_rescaled [x1−2];

with the three last points: atm=(SDR_PU_Y_rescaled [x1−1]−SDR_PU_Y rescaled [x1−3])/2;

with the four last points: atm=(SDR_PU_Y_rescaled [x1−1]−SDR_PU_Y_rescaled [x1−4])/3;

with the N last points: atm=(SDR_PU_Y_rescaled [x1−1]−SDR_PU_Y rescaled [x1−N])/(N−1);

or from any combination of the previous values of atm.

Then btm can be computed: btm=y1−atm*x1.

Then xXmax can be computed: xXmax=(1−yl+atm*x1)/atm.

The position of the point PX depends on the trend or steepness of the straight part of the specular TM curve. In order to build a consistent parabola curve (Ps), the xX abscissa of the point PX can only vary between the following value of the abscissa x1 of the point P1 and the preceding value of the abscissa xXmax of the point Ptm1, i.e. xX is in the range [x1+1, xXmax−1].

Depending on the xX position, the trend or steepness of the straight part of the specular TM curve (Ds) vary, meaning different precision when mapping the specular values of the HDR content. The steepness of the straight part of the specular mapping curve (Ds) is configurable via a value Specular_Steepness in the range [0; 1], that fix the xX abscissa of the PX point, as follow:

if Specular_Steepness=0, xX=x1+1;

otherwise, if Specular_Steepness=1, xX=xXmax−1;

otherwise, xX=x1+1+Specular_Steepness*(xXmax−x1−2).

Then yX and x2 can be computed as follows:

yX=atm*xX+btm;

x2=2*xX−x1.

as and bs can be computed as follows:

as =(1−yX)/(LUTSize−1−xX);

bs=(1000*yX−xX)/(LUTSize−1−xX).

y2 can be computed as follows:

y2=as*x2+bs.

and, ap, bp and cp can be computed as follows:

ap=(as−atm)/2/(x2−x1);

bp=(y2−y1)/(x2−x1)−ap*(x2+x1);

cp=y1−ap*x1*x1−bp*x1.

Now that all parameters are computed, the rescaled TM LUT SDR_PU_Y rescaled [i] representing the parabola part of the specular TM curve can be computed as follow for each i between x1 and x2 (i.e. i∈[x1; x2[):

$$\text{SDR\_PU\_Y\_rescaled}[i] = ap * i * i + bp * i + cp;$$

The rescaled TM LUT SDR_PU_Y_rescaled [i] representing the straight line part of the specular TM curve can be computed as follow for each i between x2 and LUTSize (i.e. i∈[x2; LUTSize[):

$$\text{SDR\_PU\_Y\_rescaled}[i] = as * i + bs;$$

The combination of the straight line part and the parabola part forms the specular TM curve and the combination of the details TM curve and the specular TM curve forms the combined TM curve.

In SL-HDR1, a TM curve is represented by variables, called luminance mapping variables. The luminance mapping variables are for instance, provided to a device in charge of applying a tone mapping to HDR data (or to a device in charge of applying an inverse tone mapping to SDR data) in the form of metadata.

In a step 405, applied in the context of SL-HDR1, the processing module 30 estimates luminance mapping variables representative of the combined TM curve represented by the rescaled TM LUT SDR_PU_Y rescaled obtained in step 404.

As described in SL-HDR1, the luminance mapping variables are defined by two sets of parameters:

The first set of parameters contains five parameters used for defining the luminance mapping curve: tmInputSignalBlackLevelOffset, tmInputSignalWhiteLevelOffset, shadowGain, highlightGain, midToneWidthAdjFactor.

The second set of parameters contains a limited number of pairs (tmOutputFineTuningX[i], tmOutputFineTuningY[i]) used in a tone mapping output fine tuning function. These pairs define coordinates of pivot points, the first coordinate tmOutputFineTuningX[i] corresponding to a position of the pivot point and the second coordinate tmOutputFineTuningY[i] corresponding to a value of the pivot point. The number of pivot points is given by a parameter tmOutputFineTuningNumVal.

FIG. 14 illustrates an example of process for determining the luminance mapping variables.

In a step 1401, the processing module 30 estimates the first set of parameters. In a first embodiment of step 1401, the first set of parameters is determined by default, as a function of the HDR peak luminance value, whatever the rescaled TM LUT SDR_PU_rescale[i] values are.

In another embodiment of step 1401, if the combined TM curve obtained with the rescaled TM LUT SDR_PU_rescale look is very far from the luminance mapping curve derived from the default set of parameters computed according to the first embodiment, an additional process is achieved. For instance, if the slopes at the origin of TM curve and the luminance mapping curve derived from the default set of parameters differ highly, the parameter shadowGain as defined in the SL-HDR1 is modified for a better matching at low luminance levels.

In steps 1402 and 1403, the processing module 30 determines the second set of parameters recursively by optimizing positions (tmOutputFineTuningX) and values (tmOutputFineTuningY) of the pivot points. In an embodiment of step 1402, the number of pivot points (given by the parameter tmOutputFineTuningNumVal) is fixed to "10", the maximum possible value according to SL-HDR1. However, the value of the parameter tmOutputFineTuningNumVal can also be lower than "10".

During step 1402, the processing module 30 applies an initialization process to the pivot points. In this initialization process, an initial set of pivot points is defined. The number of pivot points in the initial set can be set to different values, from "10" to the number of points in the rescaled TM LUT SDR_PU_rescal. As an example, the number of pivot points is set to "65". During the initialization process, each pivot point is given an initial value.

In a step 1403, the processing module 30 deletes recursively pivot points in order to keep a number of pivot points in the set equal to tmOutputFineTuningNumVal at the end of step 1403. A criterion based on a cost function is applied to determine which pivot point can be deleted. Several cost functions can be used:

a cost function corresponding to an error function between the rescaled TM LUT SDR_PU_rescale and a reconstructed rescaled TM LUT SDR_PU_rescale based on the estimated parameters;

a cost function corresponding to an error function between an up-sampled version of the tone mapping output fine tuning function with the "65" initial pivot points and an up-sampled version of the tone mapping output fine tuning function with the remaining pivot points.

Of course, in a context different from the SL-HDR1 context, the processing module 30 can compute other variables representative of a TM curve different from the luminance mapping variables defined in SL-HDR1.

In a step 406, the processing module 30 generates SDR data from the HDR data obtained in step 401 and the combined TM curve. In an embodiment, the processing module 30 of the encoding device encodes the SDR data for instance according to the format VVC and transmits the encoded SDR data along with metadata representative of the luminance mapping variables to the decoding device 22.

One can note that the rescaling step 403 could be avoided by constructing a TM curve in step 402 represented by a LUT wherein abscissas are in the range [0; HDR diffuse white] and ordinates are in the range [0; SDR diffuse white]. This LUT, called alternative LUT replaces the rescaled TM LUT in step 404, 405 and 406 and represents the details TM curve. In addition, the conversion of the TM LUT in the perceptual uniform domain of step 4031 could be optional, the rescaling of step 4032 being applied directly to the TM LUT.

We described above a number of embodiments. Features of these embodiments can be provided alone or in any combination. Further, embodiments can include one or more of the following features, devices, or aspects, alone or in any combination, across various claim categories and types:

- A bitstream or signal that includes one or more of the described SDR or HDR data and/or metadata, or variations thereof.
- Creating and/or transmitting and/or receiving and/or decoding a bitstream or signal that includes one or more of the described SDR or HDR data and/or metadata, or variations thereof.
- A server, camera, TV, set-top box, cell phone, tablet, personal computer or other electronic device that performs at least one of the embodiments described.
- A TV, set-top box, cell phone, tablet, personal computer or other electronic device that performs at least one of the embodiments described, and that displays (e.g. using a monitor, screen, or other type of display) a resulting image.
- A TV, set-top box, cell phone, tablet, personal computer or other electronic device that tunes (e.g. using a tuner) a channel to receive a signal including encoded SDR or HDR data and/or metadata, and performs at least one of the embodiments described.
- A TV, set-top box, cell phone, tablet, or other electronic device that receives (e.g. using an antenna) a signal over the air that includes SDR or HDR data and/or metadata, and performs at least one of the embodiments described.
- A server, camera, cell phone, tablet, personal computer or other electronic device that tunes (e.g. using a tuner) a channel to transmit a signal including SDR or HDR data and/or metadata, and performs at least one of the embodiments described.
- A server, camera, cell phone, tablet, personal computer or other electronic device that transmits (e.g. using an antenna) a signal over the air that includes SDR or HDR data and/or metadata, and performs at least one of the embodiments described.

The invention claimed is:

1. A method comprising:

obtaining high dynamic range data;

computing a first tone mapping curve from the high dynamic range data corresponding to low high dynamic range values of a combined tone mapping curve allowing obtaining standard dynamic range data from the high dynamic range data, wherein computing the first tone mapping curve comprises:

obtaining an intermediate tone mapping curve from the high dynamic range data, wherein non-linear luminance values of the high dynamic range data smaller than a high dynamic range diffuse white are mapped into non-linear luminance values of the standard dynamic range data;

rescaling abscissas of the intermediate tone mapping curve from a range of luminance values of the high dynamic range data between zero and the high dynamic range diffuse white to a range of luminance values of the high dynamic range data between zero and a maximum luminance value of the high dynamic range data; and mapping ordinates of the intermediate tone mapping curve in a range of luminance values of the standard dynamic range data between zero and a value depending on a standard dynamic range diffuse white to obtain the first tone mapping curve;

wherein the first tone mapping curve ends by a first point with an abscissa representative of the high dynamic range diffuse white and an ordinate representative of the standard dynamic range diffuse white; and completing the combined tone mapping curve with a second tone mapping curve for high standard dynamic range starting from the first point.

2. The method of claim 1, wherein the second tone mapping curve is a straight line.

3. The method of claim 1, wherein the second tone mapping curve comprises a parabola between the first point and a second point followed by a straight line until a third point with an abscissa representative of a high dynamic range maximum value and an ordinate representative of a standard dynamic range maximum value, the trend of the parabola being between the trend of the first tone mapping curve at the first point and the trend of the straight line at the second point.

4. The method of claim 1, further comprising computing the standard dynamic range data from the high dynamic range data using the combined tone mapping curve.

5. The method of claim 1, further comprising estimating metadata representative of the combined tone mapping curve, the metadata being intended to be inserted in video data along with the standard dynamic range data.

6. The method of claim 1, wherein, before the mapping, the ordinates of the intermediate tone mapping curve are converted in a perceptual uniform domain, and wherein converted ordinates values are between zero and a maximum ordinate value corresponding to a maximum luminance value of the standard dynamic range data.

7. A device comprising electronic circuitry configured for:

obtaining high dynamic range data;

computing a first tone mapping curve from the high dynamic range data corresponding to low high dynamic range values of a combined tone mapping curve allowing obtaining standard dynamic range data from the high dynamic range data, wherein computing the first tone mapping curve comprises:

obtaining an intermediate tone mapping curve from the high dynamic range data wherein non-linear luminance values of the high dynamic range data smaller than a high dynamic range diffuse white are mapped into non-linear luminance values of the standard dynamic range data;

rescaling abscissas of the intermediate tone mapping curve from a range of luminance values of the high dynamic range data between zero and the high dynamic range diffuse white to a range of luminance values of the high dynamic range data between zero and a maximum luminance value of the high dynamic range data; and mapping ordinates of the intermediate tone mapping curve in a range of luminance values of the standard dynamic range data between zero and a value depending on a standard dynamic range diffuse white to obtain the first tone mapping curve;

wherein the first tone mapping curve ends by a first point with an abscissa representative of the high dynamic range diffuse white and an ordinate representative of the standard dynamic range diffuse white; and completing the combined tone mapping curve with a second tone mapping curve for high standard dynamic range starting from the first point.

8. The device of claim 7, wherein the second tone mapping curve is a straight line.

9. The device of claim 7, wherein the second tone mapping curve comprises a parabola between the first point and a second point followed by a straight line until a third point with an abscissa representative of a high dynamic range maximum value and an ordinate representative of a standard dynamic range maximum value, the trend of the parabola being between the trend of the first tone mapping curve at the first point and the trend of the straight line at the second point.

10. The device of claim 7, wherein the electronic circuitry is further configured for computing the standard dynamic range data from the high dynamic range data using the combined tone mapping curve.

11. The device of claim 7, wherein the electronic circuitry is further configured for estimating metadata representative of the combined tone mapping curve, the metadata being intended to be inserted in video data along with the standard dynamic range data.

12. The device of claim 7, wherein, before the mapping, the ordinates of the intermediate tone mapping curve are converted in a perceptual uniform domain, and wherein converted ordinates values are between zero and a maximum ordinate value corresponding to a maximum luminance value of the standard dynamic range data.

13. A non-transitory computer readable medium storing instructions which, when executed by one or more processors, cause the one or more processors to perform a method comprising:

obtaining high dynamic range data;

computing a first tone mapping curve from the high dynamic range data corresponding to low high dynamic range values of a combined tone mapping curve allowing obtaining standard dynamic range data from the high dynamic range data, wherein computing the first tone mapping curve comprises:

obtaining an intermediate tone mapping curve from the high dynamic range data, wherein non-linear luminance values of the high dynamic range data smaller than a high dynamic range diffuse white are mapped into non-linear luminance values of the standard dynamic range data;

rescaling abscissas of the intermediate tone mapping curve from a range of luminance values of the high dynamic range data between zero and the high dynamic range diffuse white to a range of luminance values of the high dynamic range data between zero and a maximum luminance value of the high dynamic range data; and mapping ordinates of the intermediate tone mapping curve in a range of luminance values of the standard dynamic range data between zero and a value depending on a standard dynamic range diffuse white to obtain the first tone mapping curve;

wherein the first tone mapping curve ends by a first point with an abscissa representative of the high dynamic range diffuse white and an ordinate representative of the standard dynamic range diffuse white; and completing the combined tone mapping curve with a second tone mapping curve for high standard dynamic range starting from the first point.

14. The non-transitory computer readable medium of claim 13, wherein the second tone mapping curve is a straight line.

15. The non-transitory computer readable medium of claim 13, wherein the second tone mapping curve comprises a parabola between the first point and a second point followed by a straight line until a third point with an abscissa representative of a high dynamic range maximum value and an ordinate representative of a standard dynamic range maximum value, the trend of the parabola being between the trend of the first tone mapping curve at the first point and the trend of the straight line at the second point.

16. The non-transitory computer readable medium of claim 13, wherein the instructions further cause the one or more processors to perform computing the standard dynamic range data from the high dynamic range data using the combined tone mapping curve.

17. The non-transitory computer readable medium of claim 13, wherein the instructions further cause the one or more processors to perform estimating metadata representative of the combined tone mapping curve, the metadata being intended to be inserted in video data along with the standard dynamic range data.

18. The non-transitory computer readable medium of claim 13, wherein, before the mapping, the ordinates of the intermediate tone mapping curve are converted in a perceptual uniform domain, and wherein converted ordinates values are between zero and a maximum ordinate value corresponding to a maximum luminance value of the standard dynamic range data.

* * * * *